United States Patent
Gould

[15] 3,644,013
[45] Feb. 22, 1972

[54] THREE-DIMENSIONAL CAMERA
[72] Inventor: Gordon Gould, New York, N.Y.
[73] Assignee: Holobeam, Inc., Paramus, N.J.
[22] Filed: Aug. 21, 1968
[21] Appl. No.: 754,335

[52] U.S. Cl. ........................................350/3.5, 350/162 ZP
[51] Int. Cl. .....................................................G02b 27/22
[58] Field of Search ...............350/12, 13, 160 P, 3.5, 162 ZP

[56] References Cited

UNITED STATES PATENTS

| | | |
|---|---|---|
| 2,666,361 | 1/1954 | Boone....................................350/13 |
| 2,746,348 | 5/1956 | Leitz......................................350/13 |
| 3,107,170 | 10/1963 | Netke..............................350/3.5 UX |
| 3,488,190 | 1/1970 | Smith...............................350/162 UX |

OTHER PUBLICATIONS

Megla, Applied Optics, Vol. 5, No. 6, pp. 957-960 (6/1966)

*Primary Examiner*—David Schonberg
*Assistant Examiner*—Robert L. Sherman
*Attorney*—Hopgood and Calimafde

[57] ABSTRACT

A three-dimensional hologram producing camera utilizing a single lens system for providing a volumetric image on bulk sensitive film having a zone plate positioned in front of the lens to provide greater resolution to the recorded image point formed as a volumetric biconically shaped light distribution in the film bulk.

7 Claims, 6 Drawing Figures

INVENTOR.
GORDON GOULD

INVENTOR.
GORDON GOULD
BY
Hopgood & Calimafde
ATTORNEYS

THREE-DIMENSIONAL CAMERA

My invention relates to a three-dimensional camera and is an improvement over the invention disclosed by Melvin S. Cook, Ser. No. 855,053, filed Sept. 3, 1969, which is a continuation of Ser. No. 678,118 and now abandoned, entitled "Apparatus For and Method of Photography," owned by the assignee of this invention.

My invention may be understood by referring briefly to the camera shown in FIG. 1 which comprises a shutter 12, lens 14, lighttight box, and thick light-sensitive material or film 16 for recording light intensity. This camera is described more fully in this aforementioned application, the disclosure of which is incorporated by this reference. In that application, there is disclosed a camera having a single lens system wherein all of the lens elements are positioned so that their energy points are on a common axis. A photochromic, photosensitive plate or film is used to record a volumetric image of the object, the surfaces of the three-dimensional image corresponding in depth to the surfaces of the object. The photochromic plate is then exposed to coherent radiation, the reflected coherent radiation being directed to a two stage photosensitive means along with a portion of coherent radiation to provide the hologram.

A three-dimensional object surface 10 is imaged as a three-dimensional replica in the thick film or photosensitive material 16. That is, light from a point P on the object is focused to a corresponding point 100 in the film. The recorded image point can be well defined in space and is readily observable, especially if a low ti f-number lens is used. Since the film is sensitive all the way through, a double cone 100' and 100" is recorded with the apex 100 at the focal point. The light intensity in the cone varies inversely as the square of the distance from the focal point and will be referred to herein as a volumetric, biconically shaped light distribution in the bulk of the film.

As suggested in FIG. 2, in the prior two-stage process a holographic recording is made by shining a coherent beam through the thick film 16 on to a second film 36, and also employing a second light source or part of the first as a reference beam to provide the required interference pattern.

If the object and hence the image contained fine structure, then the image would stand out against the more uniform background density on either side of the image surface. Consider, for example, the image of a halftone print. It is composed of little dots which would be sharply focused and observable only in the immediate neighborhood of the image surface. Light would be scattered or diffracted from these which would make the image visible or allow a hologram to be made. Fine structure as used herein, means a high resolution pattern of dots, or lines, or other discrete items which can be considered to approximate points, or an array of points.

I have recognized that when the ordinary object, surface which may not contain fine structure, is imaged in the thick film, the imaged points and their cones overlap each other in such a manner as to wash out the sharp definition of the image surface. The optical density of the film will be relatively uniform or slowly varying over a considerable volume on either side of what should be the image surface. Under these circumstances, the recorded image surface may have relatively poor contrast.

An object of my invention is to provide an improved hologram made by the two-stage technique having better contrast.

A further object of the present invention is to build into the image surface of a thick film a fine structure even when it is not present in the object so as to scatter or diffract illuminating light from the image surface.

A further object is to provide an image that stands out in high signal to noise ratio against small amounts of light scattered from the more uniformly exposed medium on either side of the image surface.

Yet another object is to provide a high resolution pattern of discrete images or dots in a thick film from an object.

Still another object of my invention is to limit the thickness of depth of the light cones produced in the thick film.

The above-mentioned and other features and objects of this invention and the manner of attaining them will become more apparent and the invention itself will be best understood by reference to the following description of an embodiment of the invention taken in conjunction with the accompanying drawing, wherein.

Figure 1:
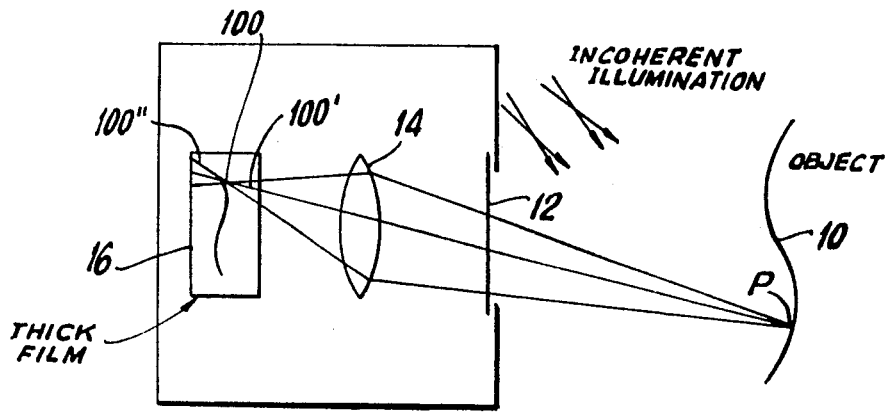
FIG. 1 is a diagram of a three-dimensional camera using a thick film.
Figure 2:
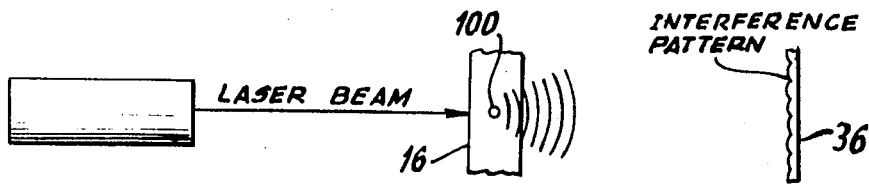
FIG. 2 is a diagram illustrating the making of a hologram using the exposed thick film of FIG. 1, and illustrating further the interference pattern of light scattered from a point recorded in a film.
Figure 3:
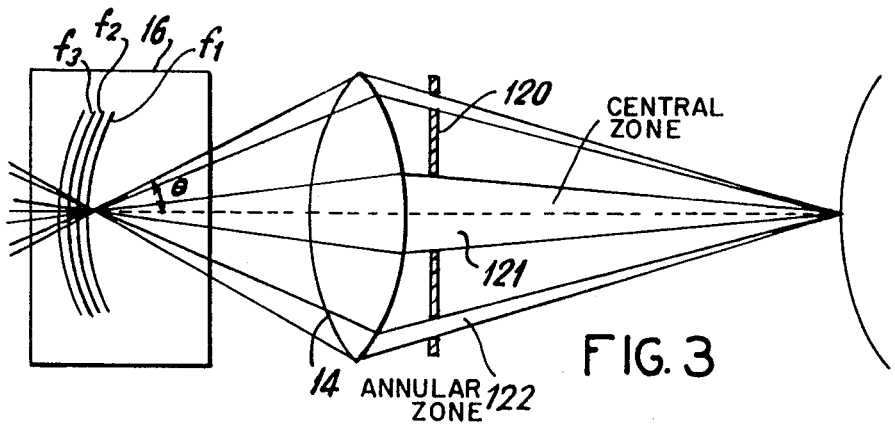
FIG. 3 is a diagram of my invention.

Referring to FIG. 3, a simple two-zone plate 120 is placed over the lens of the three-D camera. The two-zone plate shown here is simply an opaque ring dividing the plate into concentric central and annular zones or areas, the operative principle being well known in diffraction theory. Light from an object point reaches the image point on the film by passing through two zones; that is, the light passes in part through a central hole 121 in the mask and in part through an outer annular zone 122. But, all rays are focused in phase at the corresponding point on the image surface. However, at a distance of $\approx \frac{1}{2}$ wavelength ($COS\theta/1-COS\theta$) from the image surface along the line adjoining the image and object points, the light waves from the two zones will be out of phase and cancel causing the bulk light distribution to be substantially altered. Here, the primary image surface will be sharply limited in thickness. At twice and four times that distance, the waves will again be in phase and again be recorded as second and third interference fringes or image surfaces $f2$, ti $f3$ parallel to the primary ti $f1$. Actually, respective secondaries are generated both in front of and behind the primary. However, the intensity of such secondaries is smaller than the intensity at the cone apex or image point. If the bandwidth of the light illuminating the object is somewhat restricted by a filter (e.g., 5,000 A. $<\lambda<$ 6,000 A.), then four or five fringes or image layers will be defined on either side of the primary before the different component wavelengths get out of step with each other and wash out the fringe contrast.

Since coherent light of the proper wavelength will be strongly reflected, absorbed or scattered by the multiple image layers, the image will be sharply defined and can be holographically rerecorded on a second film.

The image "points" are three-dimensional interference patterns. Adjacent point-patterns will overlap and wash out the microstructure along the image surface, but not along a direction normal to that surface.

The lens must be of high enough quality to produce a diffraction limited image. To produce an optimum image, the combination of lens and mask should be designed together. It is obvious that variations in the design will heighten or reduce the contrast of image surfaces at different angles to the axis of the system.

Figure 4:
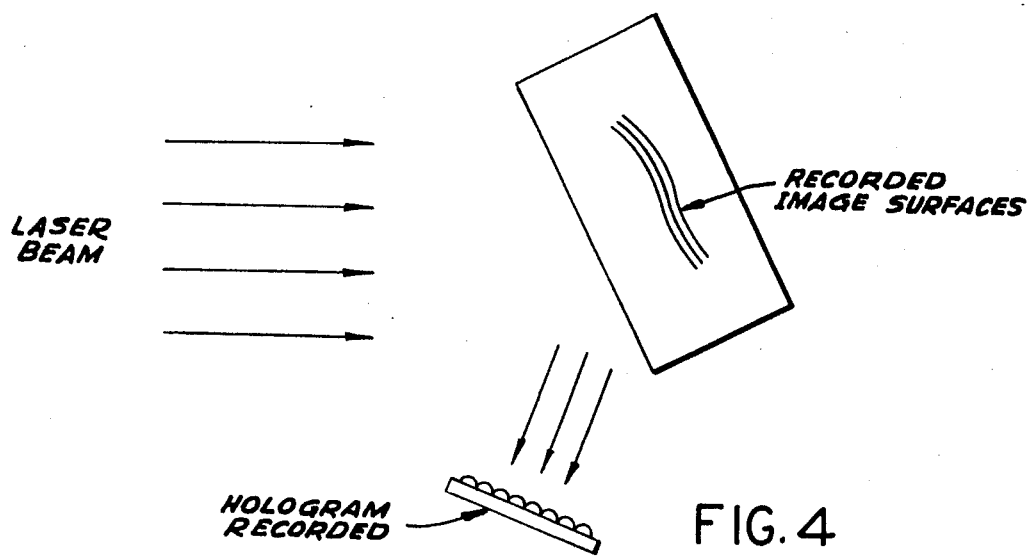
FIG. 4 is a diagram illustrating the production of a hologram.

A greater "signal-to-noise-ratio" (S/N) in the hologram may be achieved by reflection of the laser light from the three-dimensional image surfaces, as in FIG. 4. Light reflected from the several image surfaces will be mutually reinforcing if the surfaces are spaced by an integral multiple of a wavelength. That is the total reflection will be enhanced if the light is reflected from the several image surfaces in phase. The effect is like the Bragg reflection of X-rays from crystal planes. On the other hand, light scattered from irregularities elsewhere in the recording medium is not so reinforced. Thus, S/N is enhanced.

Figure 5:
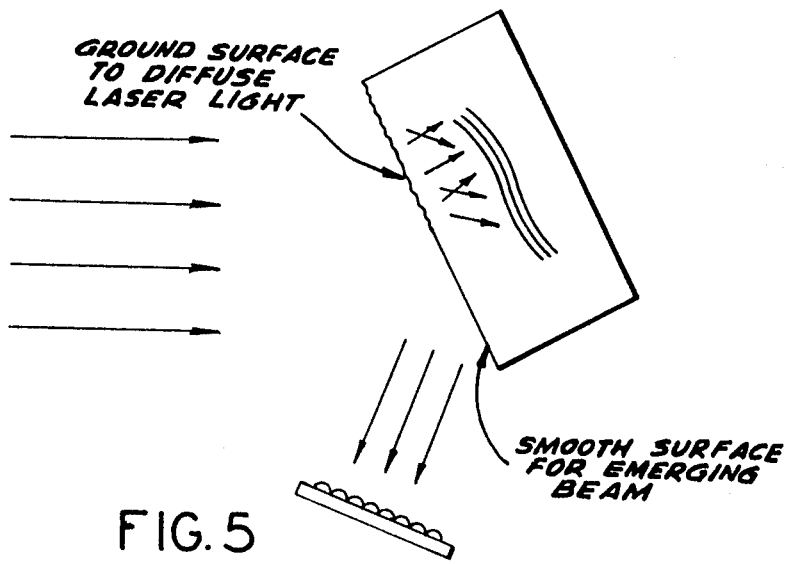
FIG. 5 is a diagram of an alternative embodiment.

Since the reflection from image surfaces will tend to be specular, the image illuminated by a collimated laser beam will appear shiny. Smooth shiny surfaces do not appear to be uniformly illuminated by a point source. This effect may be minimized by rough grinding the surface of the recording block where the laser light enters, as suggested in FIG. 5. The diffused laser light illuminates the image surfaces from various directions and thus the reflection is as if from a rough surface. Spatial diffusion of the laser light does not change its monochromatic character. Therefore, a hologram will still result from interference with a coherent reference beam.

Figure 6:
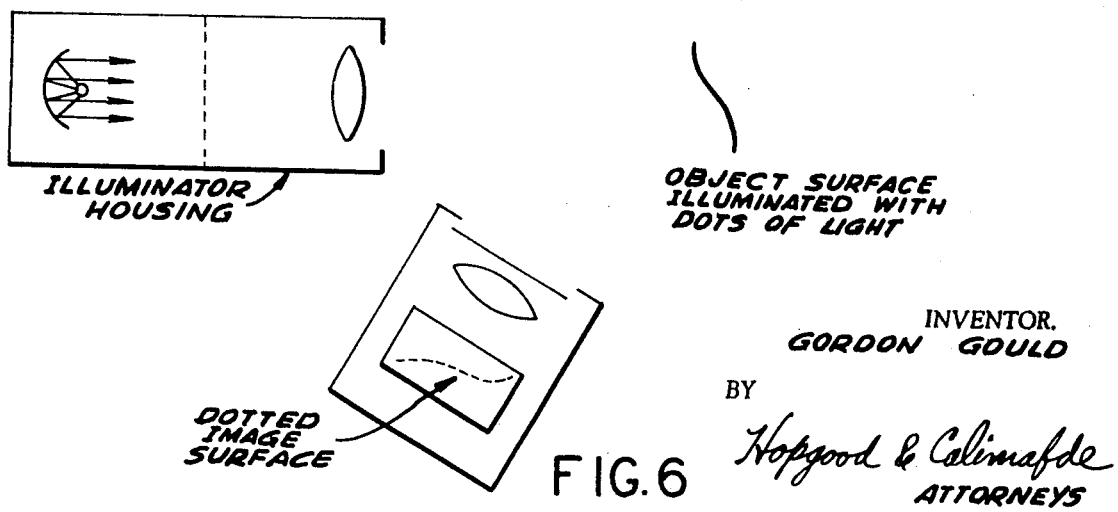
FIG. 6 is a diagram of another embodiment illustrating another means for providing a fine structure in the image surface.

Another way of artificially providing fine structure in the image surface is illustrated in FIG. 6. Light from an incoherent source is passed through a screen having an array of fine holes or meshes. The light from the holes is focused on the object. Thus, the object is illuminated by pencils of light. That is, the object is covered with dots of light. The image in the camera is then like a three-dimensional half-tone print. The recorded points (vertices of the biconical distributions of light) are resolved and scatter light sufficient to made the hologram.

While the foregoing description sets forth the principles of the invention in connection with specific apparatus, it is to be understood that this description is made only by way of example and not as a limitation of the scope of the invention as set forth in the objects thereof and in the accompanying claims.

What is claimed is:

1. A three-dimensional hologram producing camera having a light-focusing means housing and employing a thick or bulk photosensitive film material, and single lens-focusing means and a plate having two radially spaced light transmitting zones positioned in the path of light passing through said lens focusing means, which together provide a volumetric image recording in which each object point produces essentially an altered biconical shaped volume distribution of light within the bulk film and interfering light patterns.

2. An apparatus comprising first stage focusing means including a single lens system for forming an image of an object from which radiation is emanating;

first stage photosensitive means having a photochromic plate within whose volume information is retained after exposure to focused radiation coming from said first stage focusing means to provide a three-dimensional image within the volume of said photochromic plate, each object point providing essentially a biconical shaped light distribution, the surfaces of said three-dimensional image corresponding in depth to the surfaces of the object;

coherent radiation source means for illuminating an exposed first stage photosensitive means;

second stage photosensitive means which upon exposure to radiation emanating from said coherent radiation source means part of which has been diffracted by said information stored within said first stage photosensitive and part of which has not been so affected stores information characteristic of interference patterns developed by said parts of the radiation from said coherent radiation source means, and means including a plate having first and second radially light transmitting zones positioned adjacent to said single lens system to provide a high resolution fine structure to the image surface formed in the thick film.

3. The apparatus of claim 2, in which said first zone is in the form of an opening centrally formed in said plate, and said second zone is in the form of an annular space concentrically formed about said opening.

4. A camera system comprising:

first stage focusing means for forming an image of an object from which radiation is emanating;

first stage photosensitive means within whose bulk information is retained after exposure to focused radiation coming from said first stage focusing means;

coherent radiation source means for illuminating an exposed first stage photosensitive means;

second stage photosensitive means which upon exposure to radiation emanating from said coherent radiation source means, part of which has been diffracted by said information stored within said first stage photosensitive means and part of which has not been so affected, stores information characteristic of interference patterns developed by said parts of the radiation from said coherent radiation source means;

and a zone plate having first and second radially spaced light-transmitting regions positioned in front of said focusing means in the path of light passing through said light focusing means.

5. A process for forming a hologram of an object comprising:

focusing radiation with a single lens system emanating from said object within a volume of photochromic material to form a three-dimensional image within the volume of said material, the surfaces of said three-dimensional image corresponding in depth to the surface of the object;

illuminating said exposed photochromic material with coherent radiation to provide a diffraction pattern, providing a portion of said coherent radiation which has not been diffracted; and exposing photosensitive material to the interference pattern formed by that portion of said coherent radiation which has been diffracted by image stored in said illuminated initially exposed photochromic material with that portion of said coherent radiation which has not been so diffracted, and positioning a plate having first and second radially spaced light-transmitting zones intermediate said lens system and said object for providing a high resolution fine structure to the resulting image in said bulk.

6. The camera system of claim 4 in which said first stage photosensitive means includes a diffusing surface means.

7. The camera system of claim 6 in which said diffusing means comprises a roughened surface.

* * * * *